Jan. 2, 1968  J. D. BISHOP  3,361,952
DRIVEN INVERTER CIRCUIT
Filed April 11, 1966  2 Sheets-Sheet 1
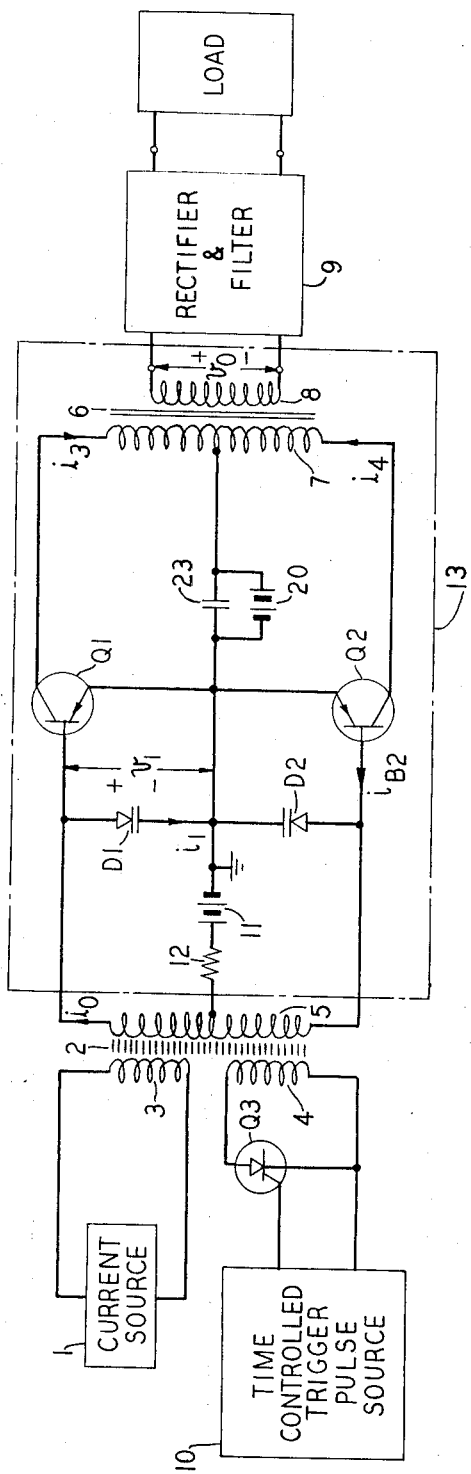
INVENTOR
J. D. BISHOP
BY John P. McDonnell
ATTORNEY

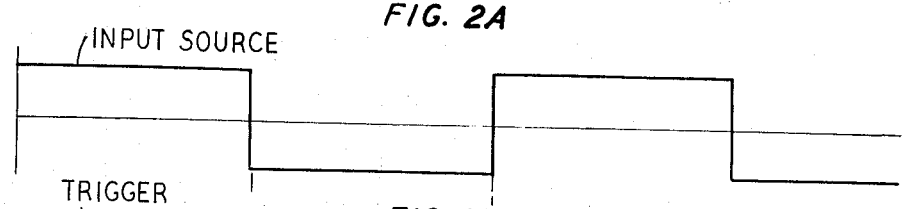
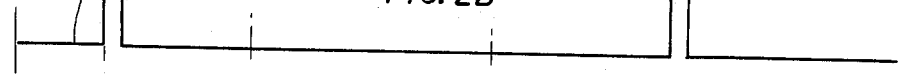
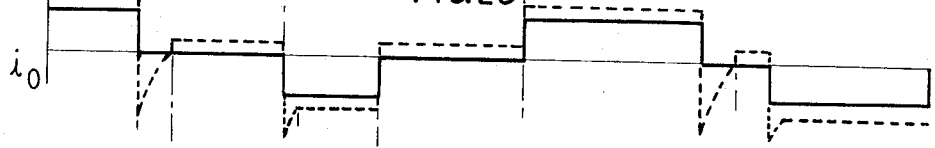
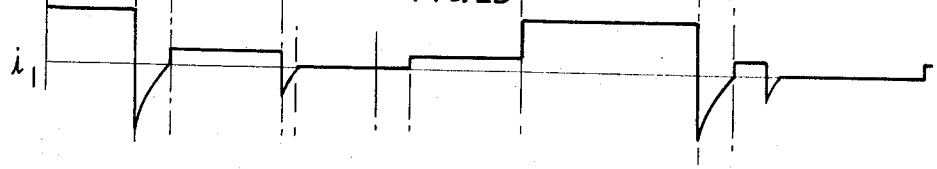
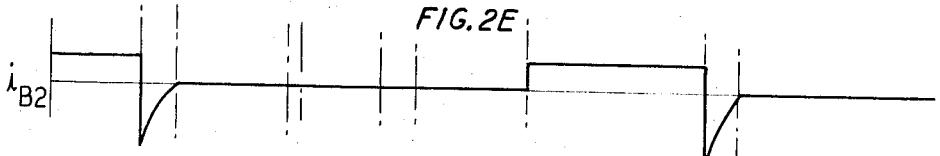
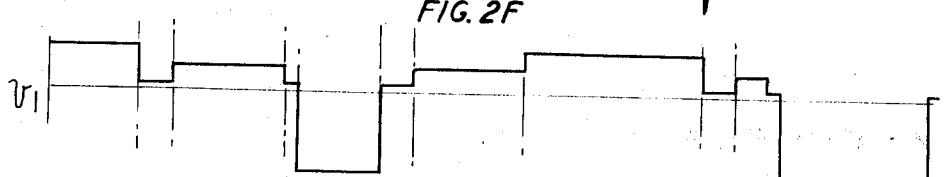
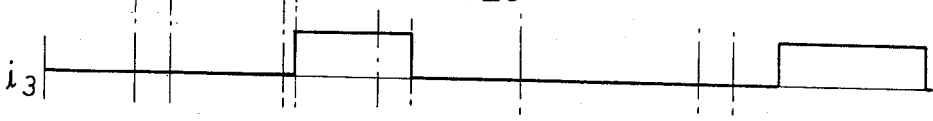
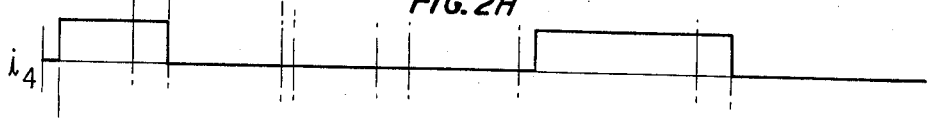
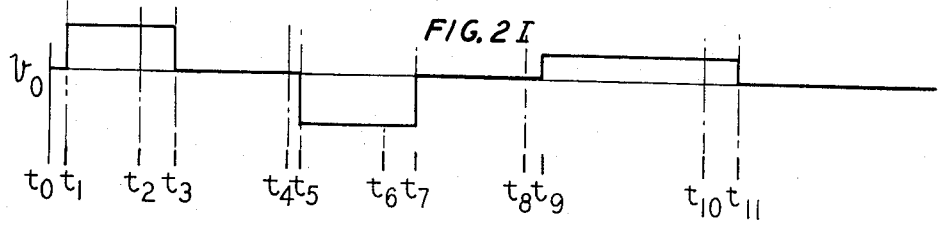

United States Patent Office 3,361,952
Patented Jan. 2, 1968

3,361,952
DRIVEN INVERTER CIRCUIT
John D. Bishop, Basking Ridge, N.J., assignor to Bell Telephone Laboratories, Incorporated, New York, N.Y., a corporation of New York
Filed Apr. 11, 1966, Ser. No. 541,666
8 Claims. (Cl. 321—45)

This invention relates to power supply systems and more particularly to DC power conversion systems.

Many different power supply systems exists which are capable of converting direct current at one voltage level to direct current at a different voltage level. For this purpose transistor power converter circuits of many designs have been devised in order to obtain units which are light, compact, efficient and relatively trouble-free. A stable or self-oscillating inverter circuits are frequently employed in conversion schemes wherein the DC input is changed to AC by the oscillator and thereafter rectified to produce a DC voltage at a different magnitude. In the absence of elaborate auxiliary circuitry, these converter circuits characteristically lack frequency stability and the ability to compensate against changes of supply voltage. These inadequacies of the self-oscillating converter are substantially eliminated in a converter circuit which is driven from an external source of stabilized frequency and which further permits the adjustment of switching transistor duty cycles.

The magnitude of the DC output voltage of a converter is directly proportional to the energy contained in the prerectified converter AC waveforms. Therefore, once the period of oscillation is fixed, the DC output voltage magnitude for a given input voltage is determined by the ratio of the pulse duration to the duration of the half period of the stable driving signal during which it appears. Thus, precise adjustment of the converter DC output voltage can be effected merely by adjusting the duty cycle of a converter driven from a stabilized frequency source. Furthermore, this adjustment can be easily made and can, for example, be made to be compensatory in response to changes in input voltage.

When a driven transistor converter is supplied from an external source, it is desirable for a number of reasons to employ a constant current source drive rather than a constant voltage source drive. For example, a voltage source drive normally requires protecting resistors with accompanying speed-up capacitors in the basic circuit path of each switching transistor in order to limit the base current drawn. This, of course, results in a waste of the power dissipated in the resistor. On the other hand, a current source drive would not only be more compatible with transistors (since they are inherently current actuated devices), but it would also eliminate the need for the protecting resistors.

For reasons such as the reduction in the physical size of filter components, it has been found desirable to operate the switching transistors in converter circuits at increasingly higher frequencies. This, of course, poses a requirement that the transistors employed have fast-switching capabilities. With this design requirement the attractiveness of employing a current source drive is diminished because of the impracticality in existing circuits of obtaining current sources with the appropriate waveshapes. Illustratively, a square wave current source could not be used to efficiently drive the transistors at the speeds required because during switching it is desirable to provide these current-actuated devices with an impulse of base current drive in order to effect a rapid change of conductivity. Obviously, a square wave current drive cannot by definition provide this impulse of current. The difficulties in obtaining current source drives with the desired waveforms has forced the prior art to be almost exclusively restricted to the use of the less desirable voltage source drive with base resistor and speed-up capacitor in order to provide the required current impulse during switching.

Accordingly, it is an object of this invention to provide an improved high frequency driven inverter circuit.

It is yet another object of this invention to provide a current source driven transistor inverter with reduced transistor switching times.

It is still another object of this invention to provide a driven inverter circuit having an adjustable duty cycle to facilitate the easy adjustment of converter DC output voltage.

In accordance with the objects of the invention, each of a pair of charge storage diodes is connected across the base-emitter junction of an associated converter switching transistor to shape the base current waveforms required for fast switching of inverter transistors driven from a square wave current source. The diodes serve both to provide an impulse of base current which acts to accelerate the externally initiated transition of the transistor from saturation to cutoff and to prevent simultaneous conduction of the transistors at the end of each half cycle of the driving source. The diodes are poled so that the associated transistors are biased off when the diode connected thereto is conducting current in its forward direction. These diodes, also known as step-recovery diodes, are described in the Proceedings of the I.R.E., January 1962 by J. L. Moll, S. Krakauer and R. Shen in an article entitled "PN Junction Charge-Storage Diodes." It is believed that the diodes store carriers in the immediate vicinity of the junction during forward conduction so that when a sudden reversal of bias is applied thereto the diodes conduct in their reverse direction for a brief interval until the stored carriers are depleted in the junction region. After the period for depletion of stored carriers is passed, the diodes recover very rapidly to present a high back-bias impedance in what is commonly called a "snap-action" recovery. The period of reverse conduction is determined by the amount of charge stored in the vicinity of the junction during forward conduction and by the rate of depletion of the stored carriers during the subsequent reverse conduction.

In the present invention, a square wave current driving source is connected to the primary winding of an input transformer. Segments of a center-tapped secondary winding on this transformer are connected to the base and emitter electrodes of each of the converter transistors. A third winding on the transformer is connected to a trigger actuated shorting switch which is responsive to external pulses to effectively short circuit the secondary winding of the transformer. The aforementioned diodes are connected so that each is between one end of this winding and the center-tap so that they are effectively connected in parallel during the time of the shorting. The diodes are connected in this fashion so that they can properly shape the base current waveform by delivering a current (due to the transfer of charge stored in the junction) to the base-emitter junctions of the transistors which is of a polarity to effect a very rapid switching between the saturated and cutoff states. With this driven inverter scheme, the trigger pulses which actuate the shorting switch can be timed to appear during each cycle of the driving current source to provide adjustment of the duty cycle of the converter AC output voltage and, therefore, an adjustment of the magnitude of the DC converter output voltage. Furthermore, the diodes act to control the switching of the transistors in a full duty cycle operation (absence of trigger pulses) by insuring that both switching transistors do not switch "on" simultaneously. This, of course, protects the transistors from possible injury.

These and other objects and features of the invention will be better understood upon consideration of the following detailed description when taken in connection with the accompanying drawings in which:

FIG. 1 is a schematic diagram of a principal embodiment of the invention; and

FIGS. 2A through 2I are graphical presentations of idealized signal waveshapes existing at various points in the circuit and which are presented for explanatory purposes.

The converter consists of an inverter circuit 13 for converting a DC source voltage 20 to an AC voltage appearing across winding 8 of transformer 6. This AC voltage is passed through rectifier and filter circuit 9 to produce the DC output voltage desired. The inverter circuit 13 includes a pair of switching transistors Q1 and Q2 coupled between input transformer 2 and output transformer 6. In this embodiment transformer 2 is a half wave shunt connected magnetic amplifier, but with appropriate changes in the switch (Q3) across winding 4, the transformer can be a nonsaturable device. Charge storage diodes D1 and D2 are connected across the base-emitter junction of transistors Q1 and Q2, respectively. Each diode is poled so that the base-emitter junction associated therewith is back-biased when the diode is conducting current in its forward direction. Winding 3 of transformer 2 couples the instant current source 1 to center-tapped winding 5 to supply the base drive for the alternate operation of transistors Q1 and Q2. Winding 4 of transformer 2 is coupled to a trigger-actuated switch such as controlled rectifier, or gate diode Q3 which may be selected from any one of a number of PNPN devices suitable for this purpose. When Q3 receives a trigger pulse from a time-controlled trigger pulse source 10, the impedance seen across winding 4 changes from a very high value to a low value approximating a short circuit. By means of the switching action to be described herein DC power from DC input source 20 is alternately switched through each half of winding 7 associated with transformer 6 to produce an AC voltage across winding 8, the inverter output. Capacitor 23 provides a low impedance path the AC and thus filters battery supply 20. Battery 11 and resistor 12 are employed to provide bias for diodes D1 and D2.

The operation of the circuit of FIG. 1 can be explained with greater detail if reference is had to the idealized waveforms shown in FIGS. 2A through 2I. It is to be assumed that current source 1 provides a square wave, such as that shown in FIG. 2A, and that a trigger pulse, as shown in FIG. 2B, is delivered by source 10 to PNPN device Q3 at some time during the positive cycle of the current source waveform. It will be shown later that the relative time position of the trigger pulse determines the duty cycle of the output AC waveform and consequently the magnitude of rectified DC output from the converter.

FIG. 2C shows the current $t_0$ defined in FIG. 1 as the current flowing in winding 5 of transformer 2. The solid portion of the waveform represents the induced component current in winding 5 which is due solely to constant current source 1. Superimposed on this waveform is a dotted portion which represents the actual and total idealized current $i_0$ attributable to current source 1, bias source 11 and the flow of charge stored in the diodes. FIG. 2D represents the current flowing through diode D1 as defined in FIG. 1 and FIG. 2E represents the base current $i_{B2}$ flowing in transistor Q2. FIG. 2F represents the voltage $v_1$ across diode D1, while FIGS. 2G and 2H represent the currents $i_3$ and $i_4$ flowing, as defined, in winding 7 of transformer 6. Finally, FIG. 2I represents the inverter AC output voltage $v_0$ across winding 8 of transformer 6. Duty cycle, as used herein, is the ratio of the duration of a $v_0$ pulse to the duration of the half cycle of driving signal in which the pulse appears.

Some time after the time $t_0$ and before the occurrence of the trigger pulse at time $t_2$, the current source 1 produces a positive current $i_0$, as defined, flowing in winding 5 of transformer 6. This current flows through diode D1 and the emitter-base junction of transistor Q2. During this time this current flow produces waveshapes for $i_0$, $i_1$ and $i_{B2}$ as shown in FIGS. 2C, 2D and 2E. Prior to time $t_2$ transistor Q2 is conducting and therefore "on," transistor Q1 is cut off and diode D1 is conducting in its forward direction. During this time the bias circuit for transistor Q2 includes winding 5 of transformer 2, diode D1 and the base-emitter junction of transistor Q2. The voltage developed across diode D1 insures that transistor Q1 remains cutoff and the voltage developed across the emitter-base junction of transistor Q2 insures that diode D2 is back-biased.

The application at time $t_2$ of the trigger pulse to PNPN device Q3 causes a low impedance to be placed across winding 4 of transformer 2. When this occurs, all of the current thereafter delivered from current source 1 appears as induced current in winding 4 so that winding 5 is effectively a short circuit having a zero voltage thereacross. The effect of the short circuit across winding 5 due to the occurrence of the trigger at time $t_2$ is the creation of a circuit which includes the following elements connected in parallel; diode D1, diode D2, base-emitter junction of transistor Q1, base-emitter junction of transistor Q2 and the series circuit of battery 11 and resistor 12. The effective connection of diode D1 in parallel with the base-emitter junction of transistor Q2 causes the charge stored previously in diode D1 to neutralize the charge stored in the base-emitter junction of the transistor due to its prior conductive state. Thus, the charge stored in diode D1 by virtue of its previously existing current flow causes a reversal in polarity of the diode current $i_1$ to neutralize the stored carriers and effect a rapid transition from saturation to cutoff of the transistor base-emitter junction. The charge stored in the diode is somewhat greater than that stored by the transistor and is therefore sufficient to insure transistor turnoff which occurs at time $t_3$ as shown in FIG. 2H. Very shortly after transistor Q2 is turned off, diode D1 recovers and the current conducted therethrough is determined by battery 11 and resistor 12 which is connected in parallel therewith during the remaining time winding 5 is short circuited. FIG. 2D shows that the decrease of stored charge in diode D1 and transistor Q2 produces an exponential decay of current between the times $t_2$ and $t_3$ and further shows that the current flowing through the diode after $t_3$ is a small positive value. FIG. 2F shows that the voltage across the diode D1 decreases from its former forward-biased value to a value slightly above zero during the time the stored charge is being dissipated to a slightly higher value determined by the biasing battery 11 and resistor 12. After this sequence of events (i.e., after $t_3$) both transistors Q1 and Q2 are cutoff since the current from source 1 reaches neither of them by virtue of the short circuit across winding 4. Therefore, neither conducts current in its collector circuit as shown in FIGS. 2G and 2H. During the time between $t_0$ and $t_2$ transformer 2 absorbs a quantity of volt-seconds sufficient to cause the core flux to decrease from its saturation value (attained on the previous half cycle) until the trigger pulse is applied at time $t_2$.

Winding 5 remains short circuited and the circuit conditions described continue until the current from input current source 1 changes in polarity at time $t_4$ as shown in FIG. 2A. At this time, the current in winding 4 of transformer 2 reverses and PNPN switch Q3 is turned off to remove the short circuit from winding 5. The current $i_0$ in winding 5 now becomes negative as shown in FIG. 2C and flows through diode D2 to the parallel combination of diode D1 and the emitter-base junction of transistor Q1. The current flowing through diode D1 in its reverse direction is sustained for only a brief duration until time $t_5$ as shown in FIG. 2D (a time sufficient to remove the charge stored by virtue of current $i_1$ flowing in diode D1 at a time immediately preceding time $t_4$). At time $t_5$, the current $i_1$ through diode D1 is reduced to zero by the recovery of the diode. After the stored charge in diode D1 has been depleted, the diode impedance changes to a very high resistance with a snap-action since it is now reverse-biased by the potential induced in winding 5. FIG. 2F shows that the voltage $v_1$ existing across diode D1 during the recovery time between $t_4$ and $t_5$ is slightly positive until the diode recovers whereupon the voltage decreases to the negative vlaue indicating that the diode is reverse-biased. It may be noted that transistor Q1 remains cutoff during this recovery time and that diodes D1 and D2 function to insure that both transistors remain "off" for a brief interval after the driving source reverses its polarity of current flow. The present invention, therefore, prevents possible damage and destruction of the transistors due to an otherwise possible simultaneous conduction thereof.

As soon as the diode D1 recovers, the base-emitter junction of transistor Q1 becomes forward-biased and transistor Q1 is turned on. This establishes the current flow $i_3$ through a path which includes input source 20, one half of winding 7 of transformer 6 and the collector-emitter junction of transistor Q1. These circuit conditions continue until sufficient flux change measured in volt-seconds has been absorbed to saturated transformer 2 at time $t_6$ as shown in FIG. 2C. When the transformer saturates the voltage across winding 5 is of course reduced to zero to produce a zero current value for $i_0$ as shown in FIG. 2C. Once again, there is effectively created the same parallel circuit described previously which includes diodes D1 and D2, base-emitter junctions of transistors Q1 and Q2 and the combination of the bias battery 11 and resistor 12. Diode D2 now delivers its stored charge to the base-emitter junction of transistor Q1 to cause the transistor to cutoff when the carriers in its base-collector junction have been depleted. This occurs at time $t_7$ shortly after which diode D2 recovers to present a high back impedance. Between the time $t_6$ and $t_7$ the voltage $v_1$ across diode D1 is insufficient to cause forward conduction, but immediately thereafter the diode current $i_1$ increases to a small positive value. As shown in FIG. 2G, the collector current $i_3$ flowing through winding 7 is reduced to zero at time $t_7$ and the current through and voltage across diode D1 becomes fixed by the battery 11 and resistor 12, as does the current through and voltage across diode D2. The short circuit across winding 5 and the parallel circuit described continues until the current from current source 1 once again changes its polarity at time $t_8$, as shown in FIG. 2A, when the cycle repeats itself.

Since the positive and negative flux excursions in the core of transformer 2 must be equal, the flux absorbed during the positive half cycle of current from source 1 sets the amount of flux which can be absorbed during the negative half cycle. Therefore, the current $i_0$ in winding 5 due to current source 1 is a symmetrical wave with a duty cycle controlled by the time occurrence of the trigger pulse shown in FIG. 2B.

The particular moment of time that the trigger pulse occurs can be made to depend upon the magnitude of the input battery voltage 20 in a manner designed to insure that each of the pulses of inverter output voltage $v_0$ (appearing across winding 8 of transformer 6) are of equal area. As described in greater detail in my copending application Ser. No. 541,578, the trigger pulse can be made to occur earlier when the magnitude of the battery voltage 20 increases and correspondingly can be made to appear at a later time in the cycle of the current source waveform if the battery voltage decreases in magnitude. Due to the circuit capability of adjusting the duty cycle by adjusting the moment during the drive current waveform that a trigger pulse appears, the inverter can deliver AC output voltage pulses which have equal areas thereunder regardless of the input battery voltage. If the pulses are tailored in this manner, the DC output from the converter after rectification and filtering will be a constant value independent of battery voltage magnitude.

FIG. 2I shows the AC output voltage $v_0$ from the converter with the waveform adjustments described. Illustratively, it is assumed that the magnitude of input battery voltage 20 decreases after the trigger pulse which occurred at time $t_2$. The next trigger pulse will be observed to occur at time $t_{10}$. It may be observed from FIGS. 2A and 2B that the time duration between the beginning of the positive cycle of the input source waveform and the occurrence of the trigger pulse is greater for the pulse which occurs at time $t_{10}$ than it is for the pulse which occurs at time $t_2$, and that the AC output voltage $v_0$ has its pulse width adjusted accordingly as shown in FIG. 2I. It is observed by reference to FIG. 2I that the area of the pulse occurring between times $t_9$ and $t_{11}$ is equal to the area of the pulse occurring between times $t_1$ and $t_3$.

The operation of the converter circuit has been described for a duty cycle less than one hundred percent. If the circuit is operated without any adjustment in duty cycle as, for example, if no time control trigger pulse source were connected to transformer Q3, or if the battery voltage was of such magnitude that the trigger pulse occurred during the negative half cycle of the current source waveform, as shown in FIG. 2A, the diodes D1 and D2 would still serve a useful function. As described above, the properties of a charge storage diode are employed to advantage during the reversal of polarity of current source 1 to insure that both transistors Q1 and Q2 are never on simultaneously.

Referring to FIGS. 2G and 2H and assuming one hundred percent duty cycle operation, the turn off of transistor Q2 represented by the fall of the current waveform $i_4$ in FIG. 2H would now occur shortly after time $t_4$ (when input source 1 reverses polarity) instead of time $t_3$ as shown. The turnoff process begins at time $t_4$ and continues during the time it takes for the removal of carriers in the base-emitter junction of transistor Q2. This removal is effected by the reversal of base current $i_{B2}$ which current includes the current $i_0$ flowing in winding 5 with a reversed polarity and approximately one half the current supplied by battery 11 through resistor 12. Since the diodes D1 and D2 are designed to store a charge which exceeds that stored by the transistor, transistor Q2 will recover before diode D1. Moments after transistor Q2 is turned off, diode D1 will recover and transistor Q1 will be abruptly turned on with a consequential flow of current $i_3$. Thus while the collector current $i_4$ of transistor Q2 is decreasing to zero and for a brief moment thereafter the collector current $i_3$ of transistor Q1 remains at a zero value. From the symmetry of the circuit it is, of course, evident that the same phenomenon would occur when the current source polarity reverses from a negative to a positive value at time $t_8$. By thus insuring that both switching transistors are never on simultaneously, a safety measure is built into the circuit.

The PNPN device Q3 shown as the switch which is being actuated in response to the occurrence of an input trigger pulse may, of course, be replaced by a conventional switching transistor which is biased on or off by a sustained pulse rather than an impulsive trigger pulse. If this substitution is made, transformer 2 need not have saturating capabilities. The voltage across winding 5 of the transformer 2 can now be made to be zero for each required portion of the duty cycle under the direct control of the transistor and sustained biasing input instead of the previous scheme which depended upon the saturation of transformer 2 to obtain the fractional duty cycle. Furthermore, battery 11 is not essential and can be eliminated from the transistor biasing supply if, for example, transistors Q1 and Q2 have sufficiently low values of $I_{co}$. Also, the invention can be practiced if a feedback signal supplies the drive for the transistors rather than the external source shown. Finally, since the disclosed circuit is composed of a pair of single ended transistor inverters, the present invention may be practiced as a single transistor inverter. In the circuit shown in the drawing, for example, current source 1, transformer 2 with triggered switch Q3, diode D1, transistor Q2 and transformer 6 form such an inverter. The inclusion of diode D2 facilitates in the illustrative single transistor inverter circuit the delayed turn on action described.

It is, therefore, to be understood that the above-described arrangements are illustrative of the application of the principles of the invention. Numerous other arrangements may be devised by those skilled in the art without departing from the spirit and scope of the invention.

What is claimed is:

1. A power inverter circuit comprising a transistor having base, emitter and collector electrodes, a source of input potential, a load, means serially connecting said load, said input potential and said collector-emitter electrodes, a charge storage diode, AC signal means serially connected with said diode and said base-emitter electrodes to drive said transistor alternately into conduction and cutoff, and a switching means for simultaneously removing said signal means from said series drive circuit and connecting said diode in parallel with said base-emitter electrodes to erect an energy transfer therebetween.

2. A power inverter circuit in accordance with claim 1 wherein said AC signal means comprises a constant current source.

3. A power inverter in accordance with claim 2 further comprising a second charge storage diode connected across said base-emitter electrodes so that regions of opposite type conductivity in each are interconnected.

4. A power inverter circuit comprising a source of input potential, a pair of transistors each having input, output and common electrodes, signal means coupled to said input and common electrodes to render each transistor alternately conductive, a load coupled to said source of input potential through the output electrodes of each alternately conducting transistor, a charge storage diode individually connected across the input and common electrode of each transistor and poled to render said transistor nonconductive when said diode is passing current in its forward direction, and switching means coupled to said signal means for simultaneously diverting energy from said transistor input electrodes and connecting said diodes in parallel to effect an energy transfer from a previously conducting diode to the input-common electrodes of a previously conducting transistor.

5. A power inverter in accordance with claim 4 wherein said signal means includes an external AC source and a transformer, said source being coupled to said transistors through said transformer.

6. A power inverter in accordance with claim 5 wherein said AC source is a constant current source.

7. A power inverter in accordance with claim 6 wherein said transformer is a half wave magnetic amplifier and said switching means includes an electrically actuable switch coupled through said half wave magnet amplifier to said signal means, said switch being responsive to actuating signals occurring during each cycle of said AC current source to control the duty cycle of said transistors.

8. A power inverter in accordance with claim 7 further including a biasing circuit and wherein said output, common and input electrodes correspond respectively to collector, emitter and base electrodes, the emitter electrodes of each transistor being interconnected, said switch comprising a semiconductor PNPN controlled rectifier having anode, cathode and gate electrodes, said magnetic amplifier includes a first winding connected to said anode and cathode, a second winding connected to said AC current source, and a third center tapped winding having ends connected to the base electrode of each transistor and having its center tap connected through said biasing circuit to said interconnected emitter electrodes.

References Cited
UNITED STATES PATENTS 3,119,972  1/1964  Fischman _____ 331—113.1
3,157,842  11/1964  Hoeks.
3,183,430  5/1965  Schonholzer _____ 321—47

JOHN F. COUCH, Primary Examiner.

W. M. SHOOP, JR., Assistant Examiner.